United States Patent [19]

Harvey, II et al.

[11] 4,209,321

[45] Jun. 24, 1980

[54] METHOD FOR MELTING MACHINE CHIPS

[75] Inventors: Francis J. Harvey, II, Murrysville; Maurice G. Fey, Pittsburgh, both of Pa.

[73] Assignee: Westinghouse Electric Corp., Pittsburgh, Pa.

[21] Appl. No.: 32,325

[22] Filed: Apr. 23, 1979

[51] Int. Cl.² ............................ C22B 4/10; C21C 5/52
[52] U.S. Cl. ..................................... 75/10 R; 75/44 S
[58] Field of Search ........................... 75/10–12, 75/44 S

[56] References Cited

U.S. PATENT DOCUMENTS

| | | | |
|---|---|---|---|
| 2,805,929 | 9/1957 | Udy | 75/11 |
| 2,805,930 | 9/1957 | Udy | 75/11 |
| 3,665,085 | 5/1972 | Dumont-Fillon | 75/11 |

*Primary Examiner*—P. D. Rosenberg
*Attorney, Agent, or Firm*—L. P. Johns

[57] ABSTRACT

A method for melting machine chips characterized by a preheating zone, a prereducer zone, and a melting zone the latter of which is heated by an arc heater through which a reducing inert gas is introduced into the communicating zones, whereby metal chips entering the preheating zone move through the subsequent zones in counterflow to the reducing gas flow.

5 Claims, 4 Drawing Figures

METHOD FOR MELTING MACHINE CHIPS

CROSS-REFERENCE TO RELATED APPLICATIONS

This application is related to copending applications, Ser. No. 797,893, filed May 17, 1977 and Ser. No. 032,325, filed Apr. 23, 1979.

BACKGROUND OF THE INVENTION

1. Field of the Invention

This invention relates to a method for preheating, prereducing, and melting metallic machining chips in conjunction with heat applied by electric arc heaters in the melting zone.

2. Description of the Prior Art

The utilization of machine chips as a feedstock in a number of melting operations is regarded as an improvement in process economics, because of the low cost of the chips. However, their use as a charge material in some melting systems is limited for several reasons including high metal loss due to oxidation and decreases in productivity. For example, in conventional induction melting of cast iron, when machine chips are charged into a furnace, a large fraction of the chips oxidized before melting. The problem is particularly troublesome because of the substantial surface area-to-volume ratio which is characteristic for machine chips.

SUMMARY OF THE INVENTION

In accordance with this invention, it has been found that existing problems inherent in prior methods may be overcome by providing a method for melting metal chips comprising the steps of placing the metal chips into a preheating chamber, moving the chips through the preheater in a counter flowing atmosphere of non-oxidizing gas to preheat the chips, and to partially eliminate any surface compounds, moving the chips into a prereducing chamber and in a counterflowing atmosphere of non-oxidizing gas to completely eliminate any surface compounds, collecting the metal chips in a melting chamber, heating the melting chamber with non-oxidizing arc superheated gases, and removing molten metal derived from the melted chips from time to time as required.

The advantage of the method of this invention is that it incorporates several functions in one structure and consequently minimizes the problems associated with transporting solids, liquids, and gases and maximizes energy efficiency and product yield.

DESCRIPTION OF THE PREFERRED EMBODIMENT

In accordance with this invention, the process provides for melting of metallic particles, such as machine chips, and comprises in particular the steps of placing metal chips into a preheating chamber containing non-oxidizing gases, moving the chips through the preheating chamber in a counterflowing atmosphere of non-oxidizing gas to preheat the chips and to partially eliminate any surface compounds, moving the chips into a prereducing chamber at the edge and in a counterflowing atmosphere of non-oxidizing gas to completely eliminate any surface compounds, collecting the chips in a melting chamber, heating the melting chamber with arc superheated, non-oxidizing gases, and removing molten metal derived from the melted particles from time to time as required.

Generally, metal chips are fed into a preheater-reducer in countermovement to exhaust gases from the melter. The preheater-reducer has a multi-purpose function including removal of water, gasification of oil to produce a reducing gas mixture containing CO and $H_2$, reduction of oxides and heating of the chips to an elevated temperature. The heated chips are then fed into the melter where the heat of fusion and the required superheat is added by exchange with the hot gases from the arc heaters. The discharge gases from the preheater-reducer flow through a gas recycle system and part of the clean gas is recycled to the arc heater. Chip melting in this manner results in a minimum of metal loss because of the non-oxidizing nature of the melting environment. Furthermore, any oxide on the surface of the chips is reduced which further increases the yield of the process.

Figure 1:
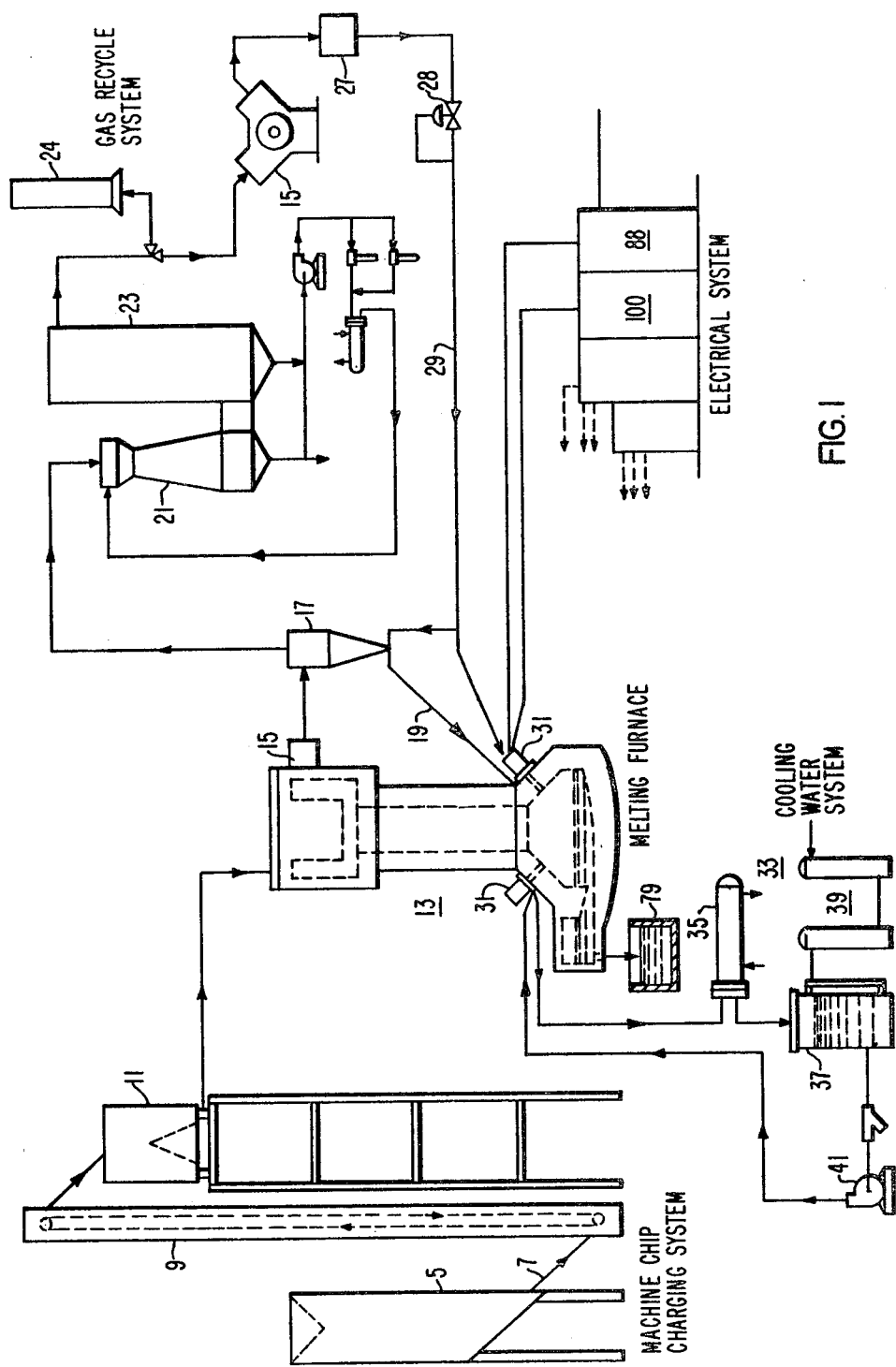
FIG. 1 is a flow diagram in accordance with this invention.

In FIG. 1 a system for handling metal chips, such as aluminum, brass, bronze, copper, cast iron, steel, superalloys, as produced in a machine shop, is shown. The system comprises a storage bin 5 for metal chips which are dispensed at outlet 7 into the lower end of an elevator 9. The chips are dumped from the upper end of the elevator into a holding bin 11 from where they flow as required to a chip melting furnace generally indicated at 13. Exhaust gas issues from an outlet 15 to a cyclone type separator 17 from where solid particles return as fires to the furnace via a conduit 19.

Gas from the cyclone separator 17 enters the top of a scrubber 21 from where it flows to a gas recycle system that includes a moisture remover or demister 23. From there it flows to a compressor 25, a dryer 27, a flow regulator 28, and then through a conduit 29 to a plurality of arc heaters 31 associated with the furnace 13. A gas burnoff stack 24 may be used for excess gas.

A water cooling system, generally indicated at 33, for cooling water from the arc heaters 31 includes a heat exchanger 35, holding tank 37, a water deionizer 39, and a pump 41 by which coolant water is circulated into and out of the arc heaters 31.

Figure 2:
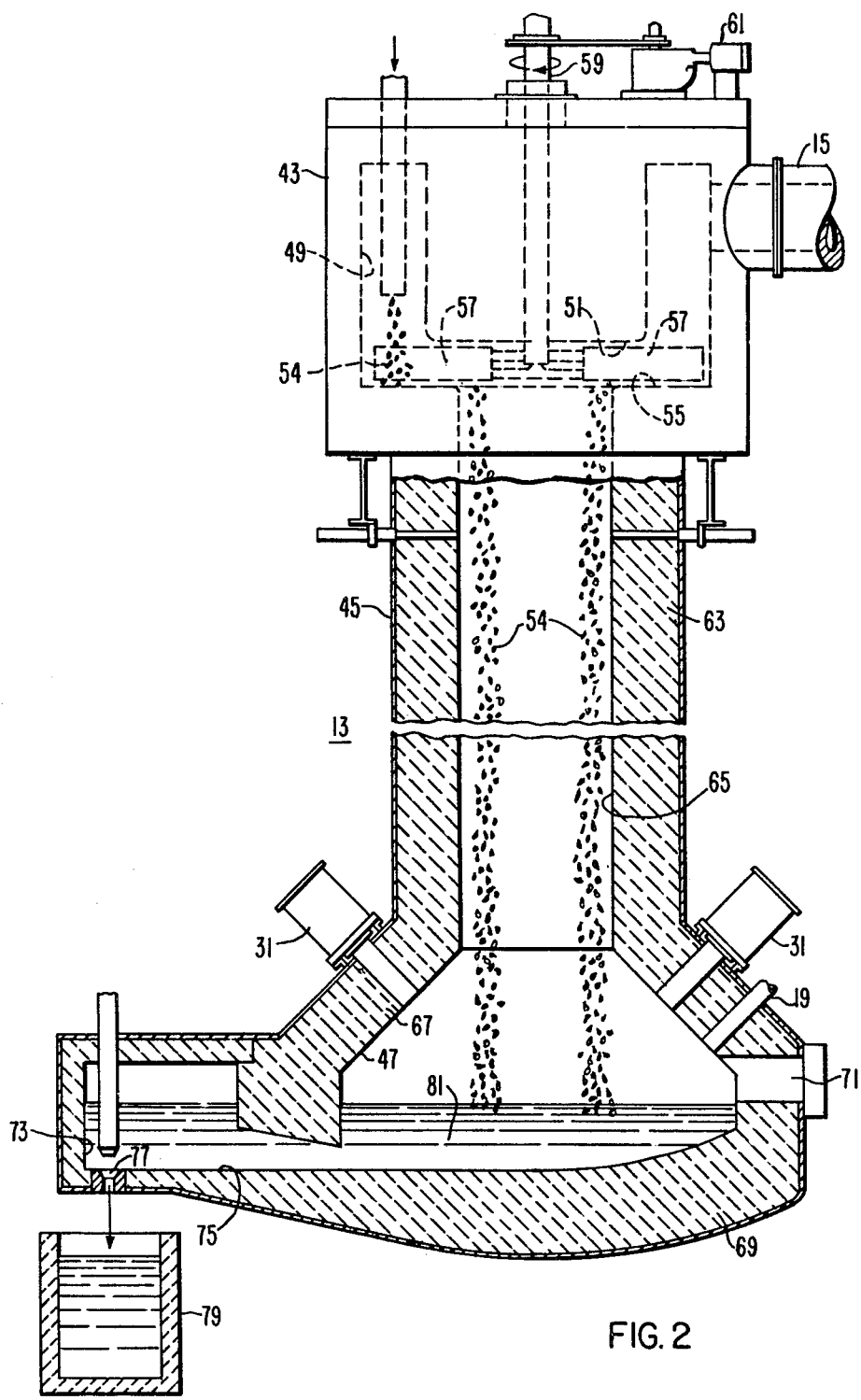
FIG. 2 is a vertical sectional view, partly in elevation, of a melting furnace for metal particles in accordance with this invention.

As shown more particularly in FIG. 2 the melting furnace 13 comprises a preheating section 43, a prereducing section 45, and a melting chamber 47. The preheating section is substantially a heating zone comprising a refractory body which includes an annular chamber 49, the lower end of which communicates with a horizontal chamber 51. A feed chute 53 delivers metal chips 54 from the holding bin 11. The chips fall upon a generally horizontal surface 55 where they are moved radially inwardly by rotating rabbles 57 which extend outwardly from the lower end of a driven shaft 59 that is driven by motor means mover 61.

The prereducing section 45 is a vertically tubular structure having a refractory wall 63 that forms a prereducing chamber 65 the upper end of which communicates with the annular surface 55 of the radial chamber 51.

The melting chamber 47 includes a truncated wall 67, a bottom wall 69, a slag hole 71, a liquid metal holding chamber 73, and a passage 75 communicating between the melting chamber 47 and holding chamber 73. A tap hole 77 is included in the bottom wall 69 for tapping metal into a mold 79. Accordingly, the furnace 13 receives metal chips, such as iron chips 54, through the chute 53. The chips fall upon the surface 55 where they are preheated as they are moved radially inwardly by the baffles 57 to the prereducing chamber 65 where they drop to the melting chamber 47 to form a molten body 81. As the chips move through the furnace 13, they move in counterflow to reducing gas which enters the furnace through the arc heaters 31 and rises from the melting chamber 47 through the prereducing chamber 65 and the preheating chamber 51 to the gas outlet 15 from where it flows through a gas recycle system as set forth above.

The arc heater 31 is similar in construction and operation to that disclosed in U.S. Pat. No. 3,705,975, but differs in some details as described herein. Generally, the arc heaters 31 are each a single phase, self-stabilizing AC device capable of power levels up to about 1500 kilowatts or up to about 9000 kilowatts for a dual three-phase plant installation. In the practice of this invention it is preferred that six arc heaters be employed, two for each of the three phases of the AC power supply.

Figure 3:
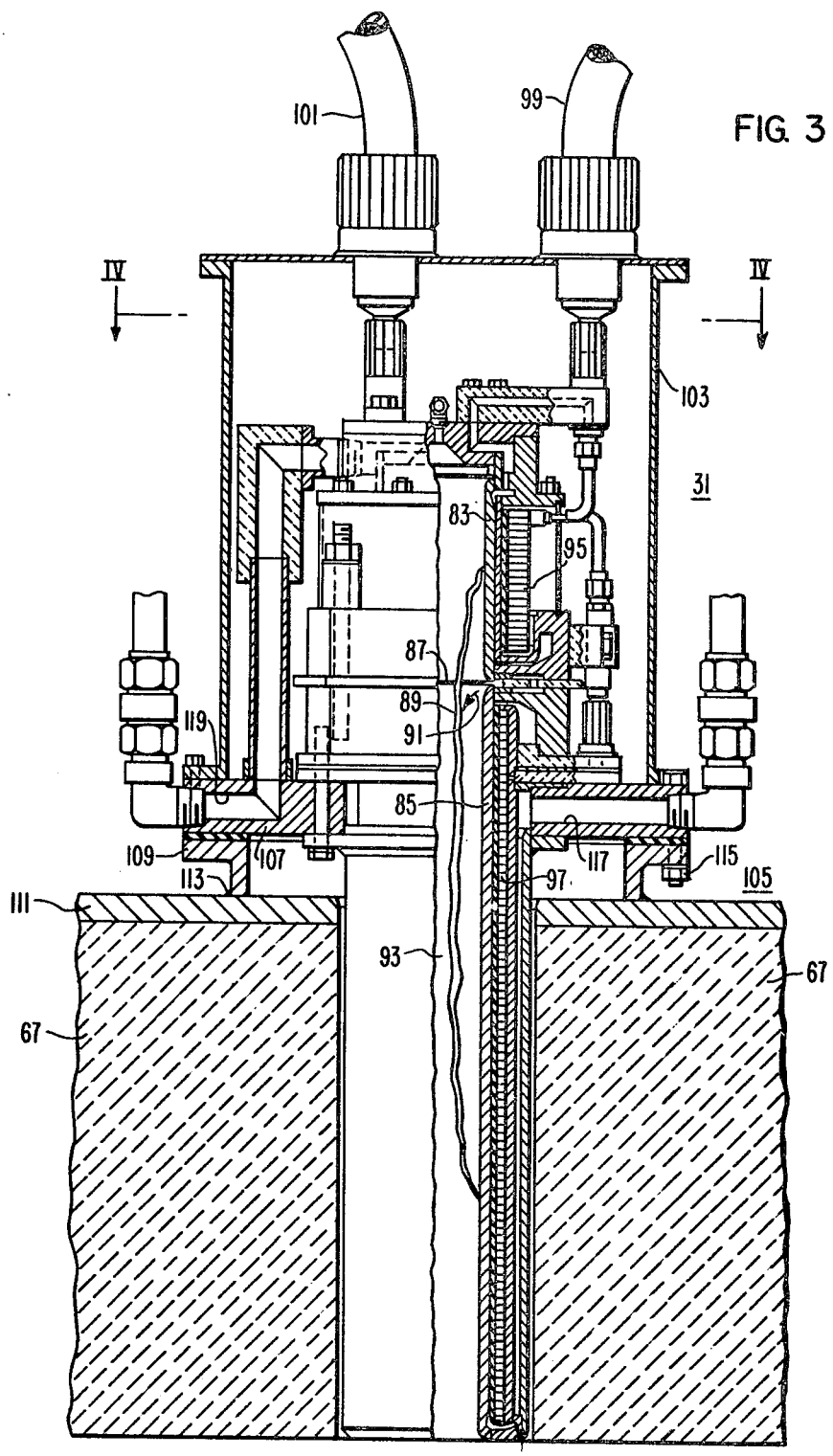
FIG. 3 is a vertical sectional view through an arc heater mounted on a position of the furnace wall.

As shown in FIG. 3 the arc heater 31 has two annular copper electrodes 83, 85 which are spaced at 87 about 1 millimeter apart to accommodate a line frequency power source 88 (FIG. 1) of about 4 kV. An arc 89 occurs in the space or gap 87 and incoming feedstock gas 91 immediately blows the arc from the space into the interior of the arc chamber 93.

The feedstock gas 91 must be compatible with the particular metal being melted in the furnace 13 and may be one of the gases selected from the group consisting of methane, hydrogen, steam, reformer gas, air, nitrogen, carbon monoxide, or mixtures thereof. The arc 89 rotates at a speed of about 1000 revolutions per second by interaction of the arc current (several thousands amps AC) with a DC magnetic field set up by internally mounted field coils 95, 97. The velocities yield a very high operating efficiency for equipment of this type and the elongated arc 89 is ultimately projected by the gas downstream toward and possibly into the melting chamber 47. A cable 99 (FIG. 3) provides a source 100 (FIG. 1) of 40 volt, DC current to the spaced coils 95, 97. Similarly, a cable 101 of AC current at 4000 volts is disposed at the upper end of the furnace 31. Both cables 99, 101 are mounted in place by means of a cover assembly 103 which encloses the upper portion of the arc heater 31 to prevent dust and other contaminants from the atmosphere from depositing on the otherwise exposed electrical terminals and causing flashover due to the high voltage involved.

Figure 4:
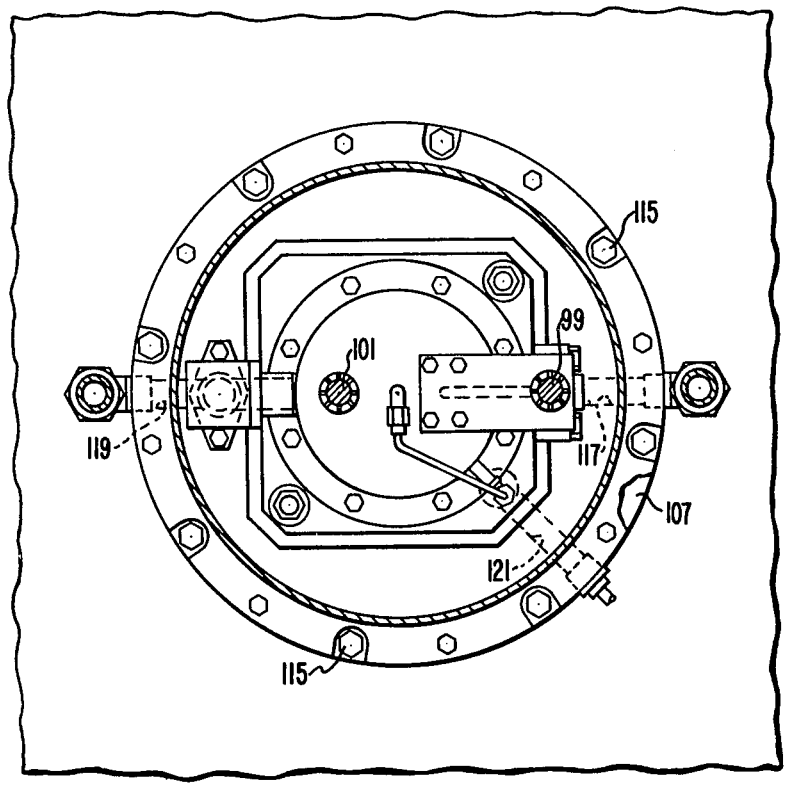
FIG. 4 is an end view of the arc heater as shown in FIG. 3.

Each arc heater 31 comprises a mounting assembly generally indicated at 105 comprising a flange 107 and a bracket 109. The flange 107 is secured to the outer metal surface 111 of the melting chamber 47 by suitable means, such as a weld 113, and the flange 107 is secured to the bracket by radially spaced nut and bolt assemblies 115. The flange 107 includes a water inlet 117 and a water outlet 119 by which coolant water is circulated into the arc heater for cooling the electrodes 83, 85 in a manner similar to that set forth in U.S. Pat. No. 3,705,975. Similarly, a gas inlet 121 (FIG. 4) is provided for conducting feed gas 91 to the space or gap 89.

Moreover, the spaced end portions of the electrodes 83, 85 at the gap or space 87 terminate in aligned, spaced, cylindrical portions devoid of out-turned radial flanges or enlarged portions as existed in arc heaters of prior construction. The resulting electrodes 83, 85 are less costly to manufacture. Furthermore, in accordance with this invention the downstream electrode 85 extends at 85a (FIG. 3) through the wall 67 of the furnace 13 to prevent the refractory in the wall from direct exposure to the high temperatures of the arc 89 and also focusing the arc more directly toward the surface of the molten body 81.

In conclusion the process of the disclosed invention is characterized by efficiency in both energy and material uses and incorporates the several functions involved into one structure thereby minimizing the problems associated with handling of solids, liquids, and gases.

What is claimed is:

1. A method for melting metal chips comprising the steps of:
    (a) feeding metal chips into a preheating chamber containing non-oxidizing gases;
    (b) moving the chips through the preheater in a counterflowing atmosphere of non-oxidizing gas to preheat the chips, and to partially eliminate any surface compounds;
    (c) moving the chips into a pre-reducing chamber and in a counterflowing atmosphere of non-oxidizing gas to completely eliminate any surface compounds;
    (d) collecting the metal chips in a melting chamber;
    (e) striking an electric arc in an axial gap between generally hollow, cylindrical electrodes, said electrodes forming a chamber for said arc;
    (f) causing the arc to rotate and form a substantially cylindrical arc path between the electrodes;
    (g) directing non-oxidizing gas through the gap into the arc chamber to thereby form an elongated arc heated gas jet;
    (h) feeding non-oxidizing gas into the melting chamber; and
    (i) removing molten metal derived from the melted chips from time to time as required.

2. The method of claim 1 in which the chips are placed on the peripheral area of the surface and moved inwardly to a central opening.

3. The method of claim 2 in which the central opening is the upper end of a vertical pre-reducing chamber.

4. The method of claim 3 in which the chips fall freely through the pre-reducing chamber and into the melting chamber.

5. The method of claim 4 in which at least one arc heater is provided for heating the melting chamber by providing the plasma arc, which arc heater comprises axially spaced, generally hollow cylindrical electrodes forming the plasma arc by feeding non-oxidizing gas through the axial space and directly the extended plasma arc into the melting chamber.

* * * * *